(12) United States Patent
Ohira et al.

(10) Patent No.: US 9,188,824 B2
(45) Date of Patent: Nov. 17, 2015

(54) DISPLAY DEVICE

(71) Applicant: Japan Display Inc., Tokyo (JP)

(72) Inventors: Hirofumi Ohira, Tokyo (JP); Akio Ota, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/178,935

(22) Filed: Feb. 12, 2014

(65) Prior Publication Data

US 2014/0232975 A1 Aug. 21, 2014

(30) Foreign Application Priority Data

Feb. 19, 2013 (JP) .................................. 2013-030442

(51) Int. Cl.
*G02F 1/1362* (2006.01)
*G02F 1/1333* (2006.01)
*G02F 1/1339* (2006.01)

(52) U.S. Cl.
CPC ...... *G02F 1/136286* (2013.01); *G02F 1/13394* (2013.01)

(58) Field of Classification Search
CPC .................. G02F 1/13394; G02F 2001/13396; G02F 2001/13398
See application file for complete search history.

(56) References Cited

U.S. PATENT DOCUMENTS

| 2007/0206135 | A1 | 9/2007 | Manabe et al. | |
|---|---|---|---|---|
| 2009/0140253 | A1* | 6/2009 | Kasahara | 257/59 |
| 2010/0321617 | A1* | 12/2010 | Jeon et al. | 349/110 |
| 2012/0105759 | A1* | 5/2012 | Park et al. | 349/43 |
| 2013/0342782 | A1* | 12/2013 | Kim et al. | 349/46 |
| 2014/0347586 | A1* | 11/2014 | Wang et al. | 349/43 |

FOREIGN PATENT DOCUMENTS

| JP | 2002-148657 | 5/2002 |
|---|---|---|
| JP | 2007-240542 | 9/2007 |

\* cited by examiner

*Primary Examiner* — Dennis Y Kim
(74) *Attorney, Agent, or Firm* — Michael Best & Friedrich LLP

(57) ABSTRACT

According to an aspect, a display device includes: a first substrate; a second substrate arranged opposite to the first substrate; a liquid crystal layer interposed between the first substrate and the second substrate; a plurality of pixels arranged in a matrix on the first substrate; a first scan line arranged between a first row of the pixels and a second row of the pixels adjacent to the first row; a second scan line arranged between the second row of the pixels and the first scan line; and a spacer for maintaining a gap between the first substrate and the second substrate. A first area on which the spacer is disposed overlaps at least part of a second area partitioned by the first scan line and the second scan line.

7 Claims, 17 Drawing Sheets

DISPLAY DEVICE

CROSS-REFERENCE TO RELATED APPLICATIONS

This application claims priority from Japanese Application No. 2013-030442, filed on Feb. 19, 2013, the contents of which are incorporated by reference herein in its entirety.

BACKGROUND

1. Technical Field

The present disclosure relates to a liquid-crystal display device. The present disclosure also relates to an electronic apparatus with the liquid-crystal display device.

2. Description of the Related Art

The liquid-crystal display device includes a pixel substrate on which elements such as a thin film transistor (TFT) are formed, a counter substrate opposite to the surface of the pixel substrate, and a liquid crystal layer interposed between the pixel substrate and the counter substrate. A spacer for maintaining a gap (cell gap) between the pixel substrate and the counter substrate is disposed between the pixel substrate and the counter substrate.

As a related technology to liquid-crystal display devices, Japanese Patent Application Laid-open Publication No. 2002-148657 (JP-A-2002-148657) describes a liquid-crystal display device with a cylindrical spacer disposed between a concave notch portion formed on one side of stripe-shaped red, green, and blue colored layers and a peripheral portion formed on the other side opposite to the notch portion. According to the technology described in JP-A-2002-148657, the cell gap can be evenly maintained.

As another related technology, Japanese Patent Application Laid-open Publication No. 2007-240542 (JP-A-2007-240542) describes a liquid-crystal display element with a spacer that is disposed on a boundary between pixels on a colored layer continuously formed between mutually adjacent pixels and that maintains a gap between an array substrate and a counter substrate. According to the technology described in JP-A-2007-240542, a gap between display elements is made even, and image reproducibility can be improved.

Arrangement of spacers greatly affects the quality of images to be displayed, and it is therefore desired that the spacers are formed and disposed in a stable manner.

For the foregoing reasons, there is a need for a display device and an electronic apparatus with the display device in which the spacers are formed and disposed in a stable manner.

SUMMARY

According to an aspect, a display device includes: a first substrate; a second substrate arranged opposite to the first substrate; a liquid crystal layer interposed between the first substrate and the second substrate; a plurality of pixels arranged in a matrix on the first substrate; a first scan line arranged between a first row of the pixels and a second row of the pixels adjacent to the first row; a second scan line arranged between the second row of the pixels and the first scan line; and a spacer for maintaining a gap between the first substrate and the second substrate. A first area on which the spacer is disposed overlaps at least part of a second area partitioned by the first scan line and the second scan line.

According to another aspect, a display device includes: a first substrate; a second substrate arranged opposite to the first substrate; a liquid crystal layer interposed between the first substrate and the second substrate; a plurality of pixels arranged in a matrix on the first substrate; a first data line arranged between a first column of the pixels and a second column of the pixels adjacent to the first column; a second data line arranged between the second column of the pixels and the first data line; and a spacer for maintaining a gap between the first substrate and the second substrate. A first area on which the spacer is disposed overlaps at least part of a second area partitioned by the first data line and the second data line.

According to another aspect, a display device includes: a first substrate; a second substrate arranged opposite to the first substrate; a liquid crystal layer interposed between the first substrate and the second substrate; a plurality of pixels arranged in a matrix on the first substrate; a first scan line arranged between a first row of the pixels and a second row of the pixels adjacent to the first row; a second scan line arranged between the second row of the pixels and the first scan line; a first data line arranged between a first column of the pixels and a second column of the pixels adjacent to the first column; a second data line arranged between the second column of the pixels and the first data line. The first area overlaps at least part of a third area partitioned by the first scan line, the second scan line, the first data line, and the second data line.

DETAILED DESCRIPTION

Exemplary embodiments for implementing the present disclosure will be explained in detail below with reference to the accompanying drawings. The present disclosure is not limited by the contents described in the following embodiments. In addition, the components described as follows include those which can be easily conceived by persons skilled in the art and those which are substantially identical thereto. Moreover, the components described as follows can be arbitrarily combined with each other. The explanation is performed in the following order.

1. Embodiments (Display device)
2. Application Examples (Electronic Apparatuses)

Examples of applying the display device according to the embodiments to electronic apparatuses.

1. Embodiments (Display Device)

Figure 1:
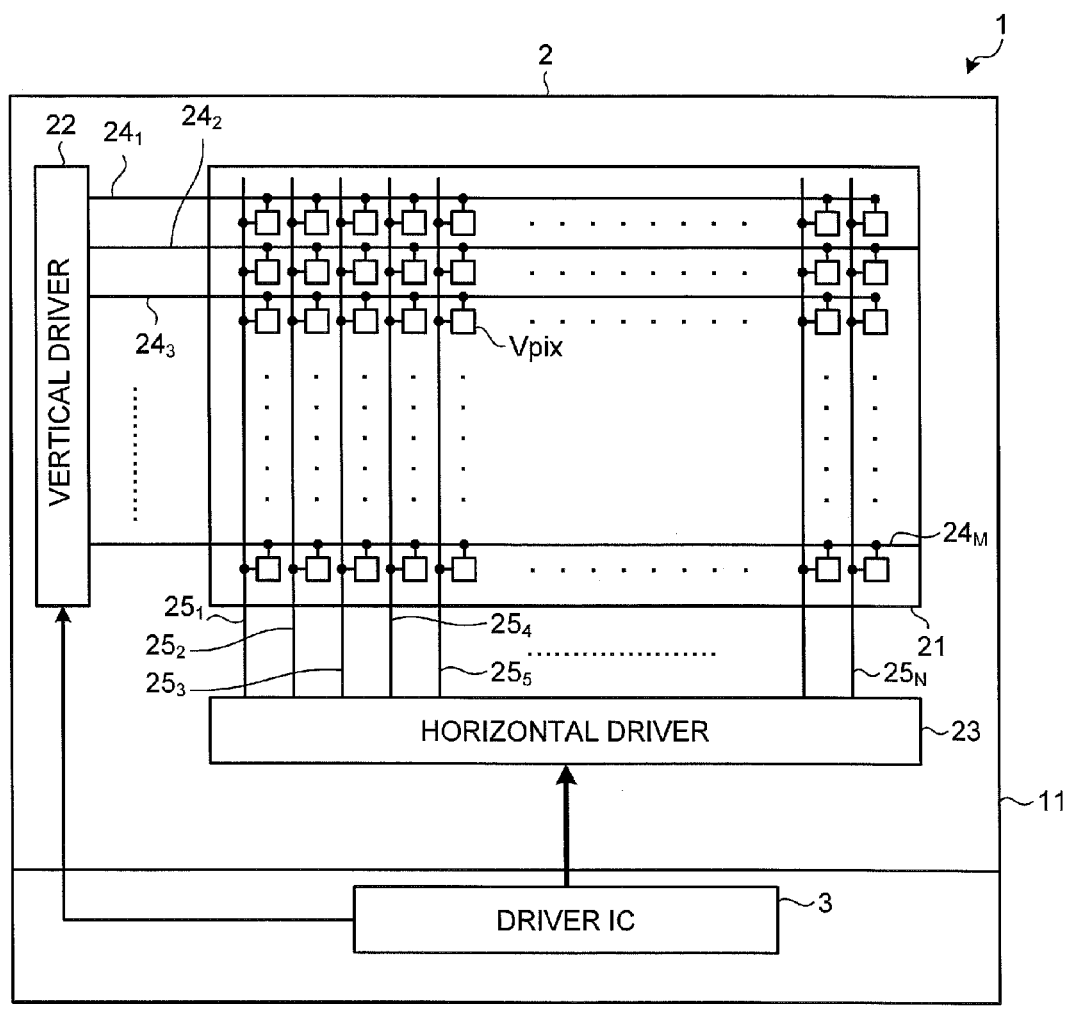
FIG. 1 is a block diagram of a system configuration example of a display device according to an embodiment.

FIG. 1 is a block diagram of a system configuration example of a display device according to an embodiment. A display device 1 corresponds to a specific example of "display device" according to the present disclosure.

The display device 1 is a transmissive or a transflective liquid-crystal display device, and includes a display panel 2 and a driver integrated circuit (IC) 3. Flexible printed circuits (FPC) (not illustrated) transmits an external signal to the driver IC 3 and/or a drive power for driving the driver IC 3 thereto. The display panel 2 includes a translucent insulating substrate such as a glass substrate 11, a display area 21 that is provided on a surface of the glass substrate 11 and on which a number of pixels each including a liquid crystal cell are arranged in a matrix (in the form of rows and columns), a horizontal driver (horizontal drive circuit) 23, and a vertical driver (vertical drive circuit) 22. The glass substrate 11 includes a first substrate, on which a number of pixel circuits each including an active element (e.g., a transistor) are arranged in a matrix, and a second substrate arranged opposite to the first substrate with a predetermined gap. The gap between the first substrate and the second substrate is maintained to the predetermined gap by photo spacers formed and disposed at locations on the first substrate. The liquid crystal is sealed between the first substrate and the second substrate.

1-1. System Configuration Example of Display Device

The display panel 2 includes the display area 21, the driver IC 3 having functions of an interface (I/F) and a timing generator, the vertical driver 22, and the horizontal driver 23 on the glass substrate 11.

In the display area 21, pixels Vpix that include a liquid crystal layer have a matrix structure in which units each forming one pixel for the display are arranged in M rows×N columns. In this specification, the row indicates a pixel row having N pieces of pixels Vpix arrayed in one direction. The column indicates a pixel column having M pieces of pixels Vpix arrayed in a direction perpendicular to the direction in which pixels Vpix included the row are arrayed. The values of M and N are determined according to a vertical display resolution and a horizontal display resolution, respectively. In the display area 21, scan lines $24_1, 24_2, 24_3 \ldots 24_M$ are wired for each row and data lines $25_1, 25_2, 25_3 \ldots 25_N$ are wired for each column with respect to an M-row/N-column array of the pixels Vpix. In the embodiments, a scan line 24 may be hereinafter described as a representative of the scan lines $24_1, 24_2, 24_3 \ldots 24_M$, and a data line 25 may be hereinafter described as a representative of the data lines $25_1, 25_2, 25_3 \ldots 25_N$. Moreover, in the embodiments, arbitrary three scan lines of the scan lines $24_1, 24_2, 24_3 \ldots 24_m$ are described as scan lines $24_m, 24_{m+1}$, and $24_{m+2}$ (where m is a natural number satisfying m≤M−2), and arbitrary four data lines of the data lines $25_1, 25_2, 25_3 \ldots 25_N$ are described as data lines $25_n, 25_{n+1}, 25_{n+2}$, and $25_{n+3}$ (where n is a natural number satisfying n≤N−3).

The display device 1 receives a master clock, a horizontal synchronization signal, and a vertical synchronization signal, which are external signals, input from an external device, and gives the signals to the driver IC 3. The driver IC 3 converts the level of the master clock, the horizontal synchronization signal, and the vertical synchronization signal each of which has a voltage magnitude of an external power supply to a voltage magnitude of an internal power supply required for driving the liquid crystal, to generate a master clock, a horizontal synchronization signal, and a vertical synchronization signal. The driver IC 3 gives the generated master clock, horizontal synchronization signal, and vertical synchronization signal to the vertical driver 22 and the horizontal driver 23. The driver IC 3 generates common voltage (counter electrode voltage) VCOM to be applied to a drive electrode provided for each pixel Vpix so that the pixels are commonly applied therewith, and applies the generated common voltage to the display area 21.

Th vertical driver 22 sequentially samples and latches display data output from the driver IC 3 for one horizontal period in synchronization with a vertical clock pulse. The vertical driver 22 sequentially outputs the latched one-line digital data as a vertical scan pulse to give it to the scan lines $24_m, 24_{m+1}$, and $24_{m+2} \ldots$ of the display area 21, and thereby sequentially selects pixels Vpix row by row. The vertical driver 22 sequentially outputs the digital data from, for example, an upper side of the scan lines $24_m, 24_{m+1}$, and $24_{m+2} \ldots$ of the display area 21, i.e., an upper direction of vertical scanning to a lower side of the display area 21, i.e., a lower direction of vertical scanning. The vertical driver 22 can also sequentially output the digital data from a lower side of the scan lines $24_m, 24_{m+1}$, and $24_{m+2} \ldots$ of the display area 21, i.e., a lower direction of vertical scanning to an upper side of the display area 21, i.e., an upper direction of vertical scanning.

The horizontal driver 23 is given, for example, 6-bit R (red), G (green), and B (blue) digital video data Vsig. The horizontal driver 23 writes display data to each pixel Vpix of a row selected through vertical scanning performed by the vertical driver 22 for each pixel, or for each pixels, or for all pixels at one time via the data lines 25.

In the display device 1, a direct voltage having the same polarity is continuously applied to a liquid crystal element, which may possibly cause deterioration of specific resistance (substance-specific resistance) of the liquid crystal, or the like. The display device 1 adopts a driving method for inverting the polarity of a video signal at a predetermined frequency with respect to the common voltage VCOM of a drive signal in order to prevent deterioration of the liquid-crystal specific resistance (substance-specific resistance) or the like.

As the driving method for a liquid-crystal display panel, driving methods such as a line inversion driving method, a dot inversion driving method, and a frame inversion driving method are known. The line inversion driving method is a driving method of inverting the polarities of video signals at a time period of 1 H (H: horizontal period) corresponding to one line (one pixel row). The dot inversion driving method is a driving method of alternately inverting the polarities of video signals for each pixels on the left, right, top, and bottom adjacent to each other. The frame inversion driving method is a driving method of inverting video signals, which are written to all pixels for each frame corresponding to one screen, with the same polarity at one time. The display device 1 can adopt any one of the driving methods.

1.2 Comparative Example

Figure 2:
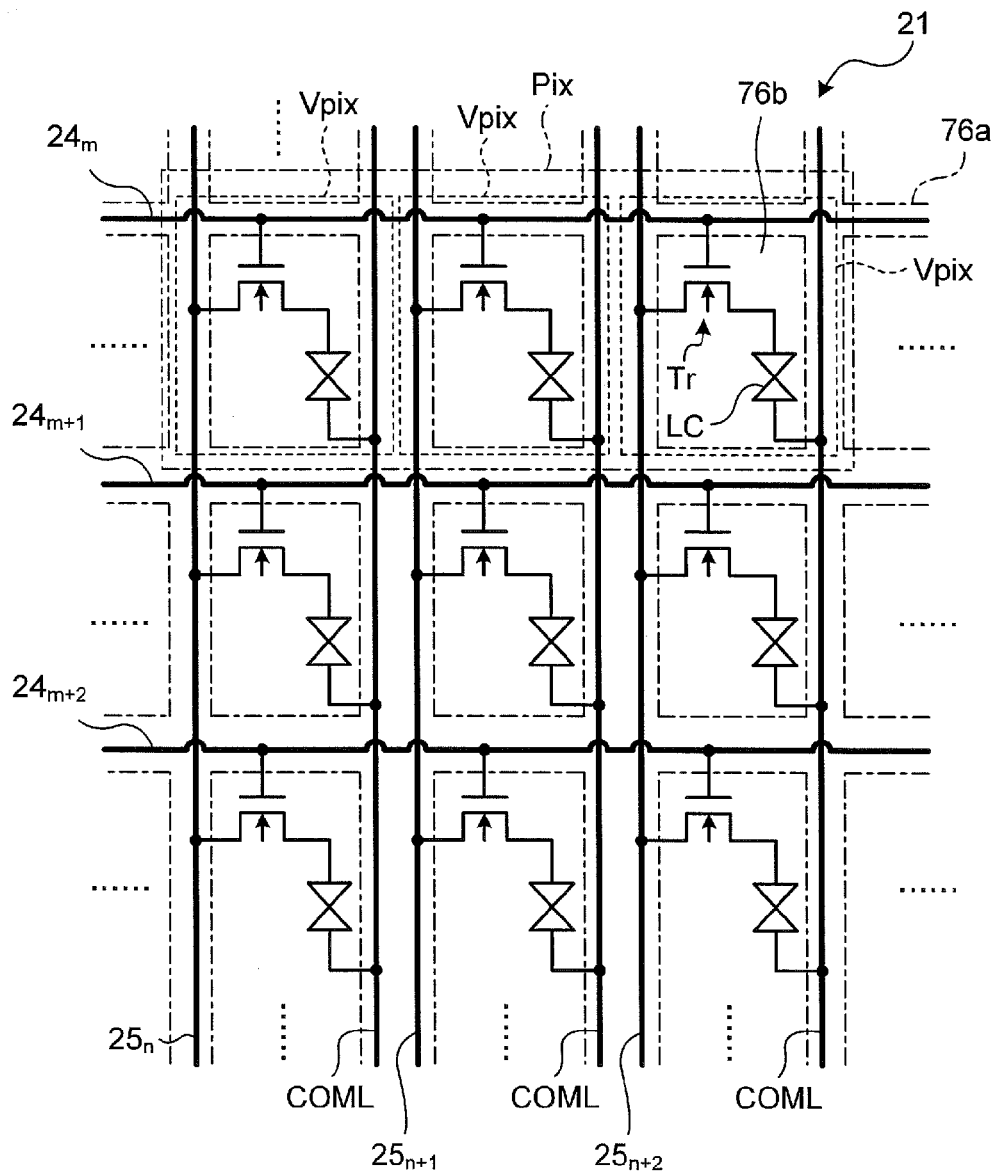
FIG. 2 is a circuit diagram of a drive circuit that drives pixels of a display device according to a comparative example.

FIG. 2 is a circuit diagram of a drive circuit that drives pixels of a display device according to a comparative example. Formed in the display area 21 are wirings such as the data lines $25_n$, $25_{n+1}$, and $25_{n+2}$ for supplying a pixel signal as display data to thin film transistor (TFT) elements Tr of the pixels Vpix and the scan lines $24_m$, $24_{m+1}$, and $24_{m+2}$ for driving the TFT elements Tr respectively. In this way, the data lines $25_n$, $25_{n+1}$, and $25_{n+2}$ are extended along a plane parallel to the surface of the glass substrate 11 to supply the pixel signal for displaying an image to the pixels Vpix. The pixel Vpix includes the TFT element Tr and a liquid crystal element LC. The TFT element Tr is composed of a thin film transistor, which is, in this example, an n-channel metal oxide semiconductor (MOS) TFT. One of a source or a drain of the TFT element Tr is coupled to one of the data lines $25_n$, $25_{n+1}$, and $25_{n+2}$, a gate thereof is coupled to one of the scan lines $24_m$, $24_{m+1}$, and $24_{m+2}$, and the other of the source or the drain is coupled to one end of the liquid crystal element LC. One end of the liquid crystal element LC is coupled to the other of the source or the drain of the TFT element Tr, and the other end of the liquid crystal element LC is coupled to a drive electrode COML.

The pixel Vpix is coupled to the other pixels Vpix belonging to the same row of the display area 21 through one of the scan lines $24_m$, $24_{m+1}$, and $24_{m+2}$. The scan lines $24_m$, $24_{m+1}$, and $24_{m+2}$ are coupled to the vertical driver 22 and are supplied with a vertical scan pulse Vgate of a scan signal from the vertical driver 22. The pixel Vpix is coupled to the other pixels Vpix belonging to the same column of the display area 21 through one of the data lines $25_n$, $25_{n+1}$, and $25_{n+2}$. The data lines $25_n$, $25_{n+1}$, and $25_{n+2}$ are coupled to the horizontal driver 23 and are supplied with a pixel signal from the horizontal driver 23. Furthermore, the pixel Vpix is coupled to the other pixels Vpix belonging to the same column of the display area 21 through the drive electrode COML. The drive electrode COML is coupled to a drive electrode driver (not illustrated) to be supplied with a drive signal from the drive electrode driver.

The vertical driver 22 illustrated in FIG. 1 applies a vertical scan pulse to the gates of the TFT elements Tr of the pixels Vpix through the scan lines $24_m$, $24_{m+1}$, and $24_{m+2}$ illustrated in FIG. 2 to thereby sequentially select one row (one horizontal line), as a target to be driven for display, from among the pixels Vpix formed in the matrix in the display area 21. The horizontal driver 23 illustrated in FIG. 1 supplies the pixel signal to each of the pixels Vpix included in one horizontal line sequentially selected by the vertical driver 22 through the respective data lines $25_n$, $25_{n+1}$, and $25_{n+2}$ illustrated in FIG. 2. Thus, one horizontal line is displayed according to the supplied pixel signals. The drive electrode driver applies a drive signal so as to drive the drive electrodes COML in each drive electrode block including a predetermined number of drive electrodes COML.

As explained above, the display device 1 performs the drive so that the vertical driver 22 sequentially scans the scan lines $24_m$, $24_{m+1}$, and $24_{m+2}$, thereby sequentially selecting one horizontal line. In the display device 1, the horizontal driver 23 supplies pixel signals to the pixels Vpix belonging to the one horizontal line, so that the horizontal line is displayed one line by one line. Upon the display operation, the drive electrode driver applies a drive signal to the drive electrodes COML corresponding to the one horizontal line.

The display area 21 further has a color filter. The color filter has a lattice-shaped black matrix 76a and openings 76b. The black matrix 76a is formed so as to cover the outer periphery of each pixel Vpix as illustrated in FIG. 2. That is, the black matrix 76a is arranged on boundaries each between two-dimensionally arranged pixel Vpix and pixel Vpix, and a lattice shape is thereby formed. The black matrix 76a is composed of a material having a high light absorptivity. The openings 76b are openings formed by the lattice shape of the black matrix 76a and are arranged corresponding to respective pixels Vpix.

The opening 76b includes color areas colored in three colors, for example, red (R), green (G), and blue (B). The color filter is such that the color areas of the color filter colored in the three colors, for example, red (R), green (G), and blue (B) are periodically arranged in the openings 76b and the color areas in the three colors of R, G, and B are associated with each of pixels Vpix illustrated in FIG. 2 as a set being a pixel Vpix.

The color filter may be a combination of other colors if the color areas are colored in different colors. In the color filter, the luminance of the color area of green (G) is generally higher than that of the color area of red (R) and of the color area of blue (B). The color filter may not be provided, and the color area is white in this case. Alternatively, light transmissive resin is used for a color filter, so that the color area may also be made white.

In the display area 21, when viewed from a direction perpendicular to the front, the scan lines 24 and the data lines 25 are arranged in an area that is overlapped by the black matrix 76a of the color filter. In other words, the scan lines 24 and the data lines 25 are behind the black matrix 76a when they are viewed from the direction perpendicular to the front. In the display area 21, the openings 76b are areas where the black matrix 76a is not arranged.

In the comparative example, the scan lines $24_m$, $24_{m+1}$, and $24_{m+2}$ are arranged at equal intervals, and the data lines $25_n$, $25_{n+1}$, and $25_{n+2}$ are also arranged at equal intervals. The pixels Vpix are arranged in the same orientation in areas partitioned by the scan lines $24_m$, $24_{m+1}$, and $24_{m+2}$ and the data lines $25_n$, $25_{n+1}$, and $25_{n+2}$.

Figure 3:
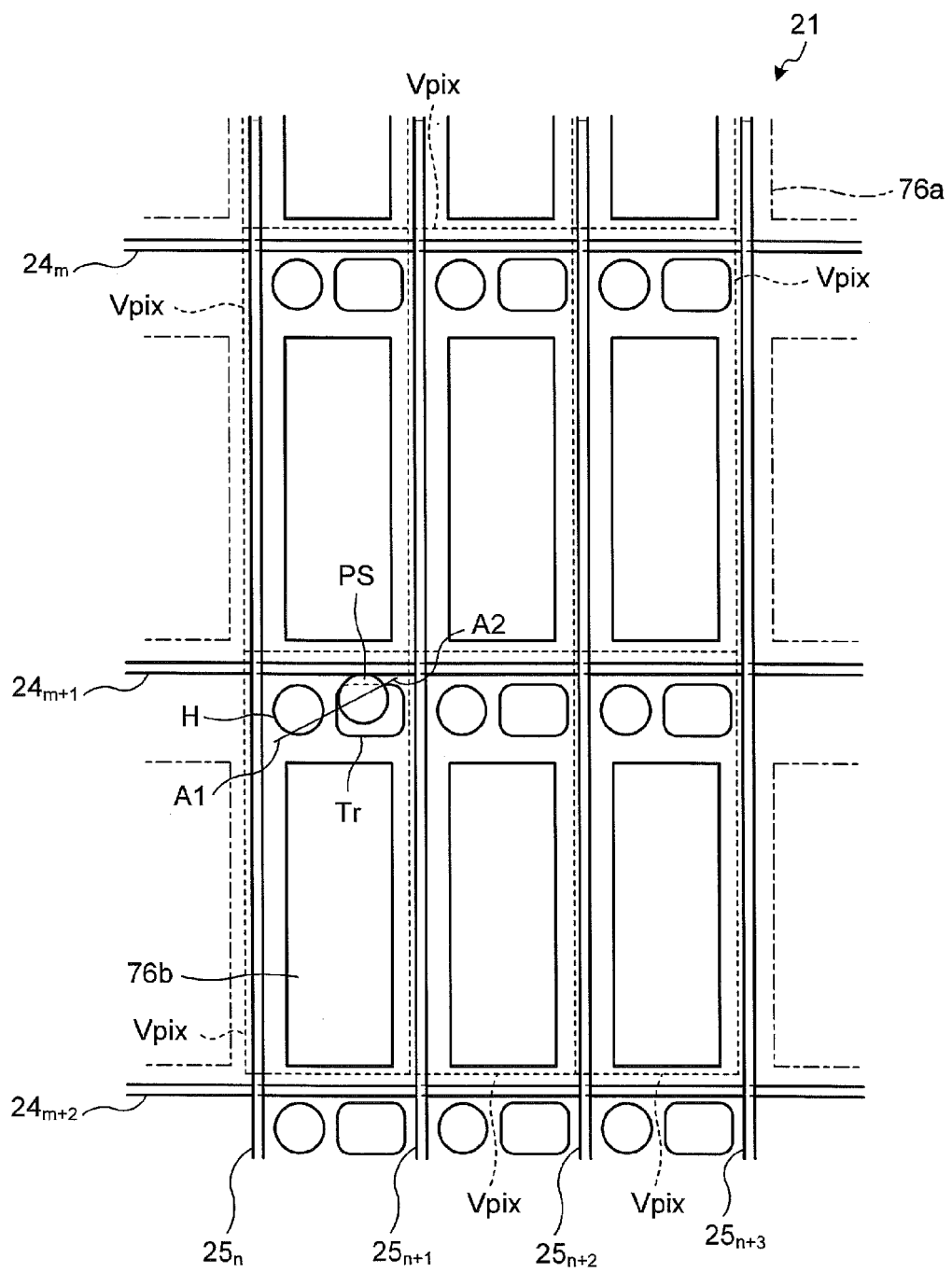
FIG. 3 is a layout diagram of the drive circuit that drives the pixels of the display device according to the comparative example.

FIG. 3 is a layout diagram of the drive circuit that drives pixels of the display device according to the comparative example. Each of the pixels Vpix has the opening 76b formed in a lower part thereof in a vertical scanning direction (lower side in the figure), has the TFT element Tr arranged in the right of an upper side thereof in the vertical scanning direction (upper side in the figure), and has a contact hall H, through which the pixel electrode is coupled to a drain electrode of the TFT element Tr, formed in the left of an upper side thereof in the vertical scanning direction (upper side in the figure). The drain of the TFT element Tr mentioned here includes part of a semiconductor layer (active layer) and the drain electrode. Likewise, the source of the TFT element Tr mentioned here includes other part of the semiconductor layer (active layer) and a source electrode. A cylindrical photo spacer PS for maintaining a predetermined gap (cell gap) between the first substrate and the second substrate is disposed above the TFT element Tr (on the near side in a direction perpendicular to the front).

Figure 4:
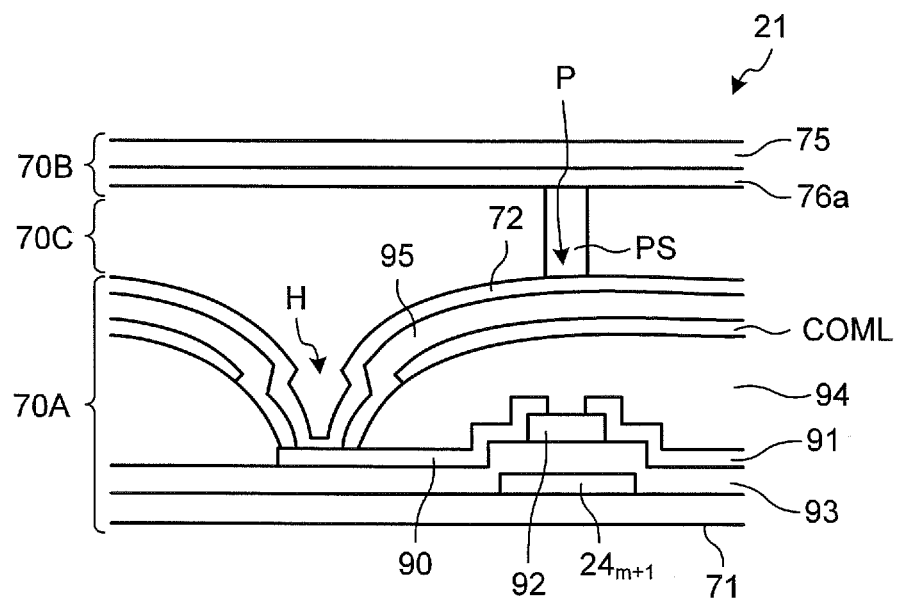
FIG. 4 is a cross-sectional view along line A1-A2 in FIG. 3.

FIG. 4 is a cross-sectional view along line A1-A2 in FIG. 3. The display area 21 includes, as illustrated in FIG. 4, a pixel substrate (first substrate) 70A, a counter substrate (second substrate) 70B arranged to face the pixel substrate 70A in the vertical direction with respect to the surface of the pixel substrate 70A, and a liquid crystal layer 70C interposed between the pixel substrate 70A and the counter substrate 70B. A backlight (not illustrated) is arranged on a face of the pixel substrate 70A on the opposite side to the liquid crystal layer 70C.

The liquid crystal layer 70C is used to modulate light passing therethrough according to the state of the electric field, and a liquid crystal in a horizontal electric field mode such as a fringe field switching (FFS) mode and an in-plane switching (IPS) mode can be used. A liquid crystal in various modes such as twisted nematic (TN) mode, a vertical alignment (VA) mode, and an electrically controlled birefringence (ECB) mode may be used. Alignment films may be provided between the liquid crystal layer 70C and the pixel substrate 70A and between the liquid crystal layer 70C and the counter substrate 70B illustrated in FIG. 4, respectively.

The counter substrate 70B includes a glass substrate 75 and the black matrix 76a formed on a face of the glass substrate 75. The black matrix 76a faces the liquid crystal layer 70C in the vertical direction with respect to the pixel substrate 70A.

The pixel substrate 70A includes a TFT substrate 71 as a circuit board. The scan line $24_{m+1}$ is formed on the TFT substrate 71. A gate insulating film 93 is formed over the scan line $24_{m+1}$. An amorphous silicon (a-Si) semiconductor layer 92 constituting a TFT element Tr is formed over the gate insulating film 93 above the scan line $24_{m+1}$. A source electrode 91 constituting the TFT element Tr is formed on the right side of the semiconductor layer 92 in the figure and over the gate insulating film 93. The source electrode 91 is electrically coupled to part of the semiconductor layer 92. The source electrode 91 is electrically coupled to the data line 25 (not illustrated). A drain electrode 90 constituting the TFT element Tr is formed on the left side of the semiconductor layer 92 in the figure and over the gate insulating film 93. The drain electrode 90 is electrically coupled to other part of the semiconductor layer 92.

Formed over the TFT element Tr is an organic insulating film 94 composed of organic components. The drive electrode COML is formed over the organic insulating film 94 and from above the drain electrode 90 of the TFT element Tr to above the source electrode 91 thereof. The drive electrode COML is a translucent electrode composed of a translucent conductive material (translucent conductive oxide) such as indium tin oxide (ITO). An insulating film 95 is formed over the drive electrode COML and above the organic insulating film 94. The drive electrode COML is vertically enclosed by the organic insulating film 94 and the insulating film 95 to be insulated from the TFT element Tr.

The contact hall H is formed on the drain electrode 90 through the organic insulating film 94 and the insulating film 95. A pixel electrode 72 is formed over the drain electrode 90 and the insulating film 95. The pixel electrode 72 and the drain electrode 90 are coupled to each other at the bottom of the contact hall H. A photo spacer PS for maintaining the gap between the pixel substrate 70A and the counter substrate 70B to a predetermined gap is formed on the pixel electrode 72 and above the TFT element Tr.

A wall of the contact hall H is preferably perpendicular to a principal surface of the TFT substrate 71. However, because the contact hall H is formed by etching the organic insulating film 94 and the insulating film 95, the wall of the contact hall H becomes actually a smoothly curved surface as illustrated in FIG. 4. The curved surface stretches to an upper surface (top surface) P of the insulating film 95 above the semiconductor layer 92. Accordingly, the photo spacer PS is formed on the curved surface, which prevents the photo spacer PS from being formed on the pixel electrode 72 in a sufficiently stable manner. Therefore, in the comparative example, it is necessary to enlarge the black matrix 76a in order to conceal alignment defect caused by scratches due to the photo spacers PS. The enlargement of the black matrix 76a causes the opening 76b to be smaller, which results in lowering of luminance and degradation of display quality. Moreover, in the comparative example, the photo spacer PS cannot be formed on the pixel electrode 72 sufficiently stably, and therefore unevenness of the cell gap becomes greater, which leads to degradation of image quality.

1-3. First Embodiment

Figure 5:
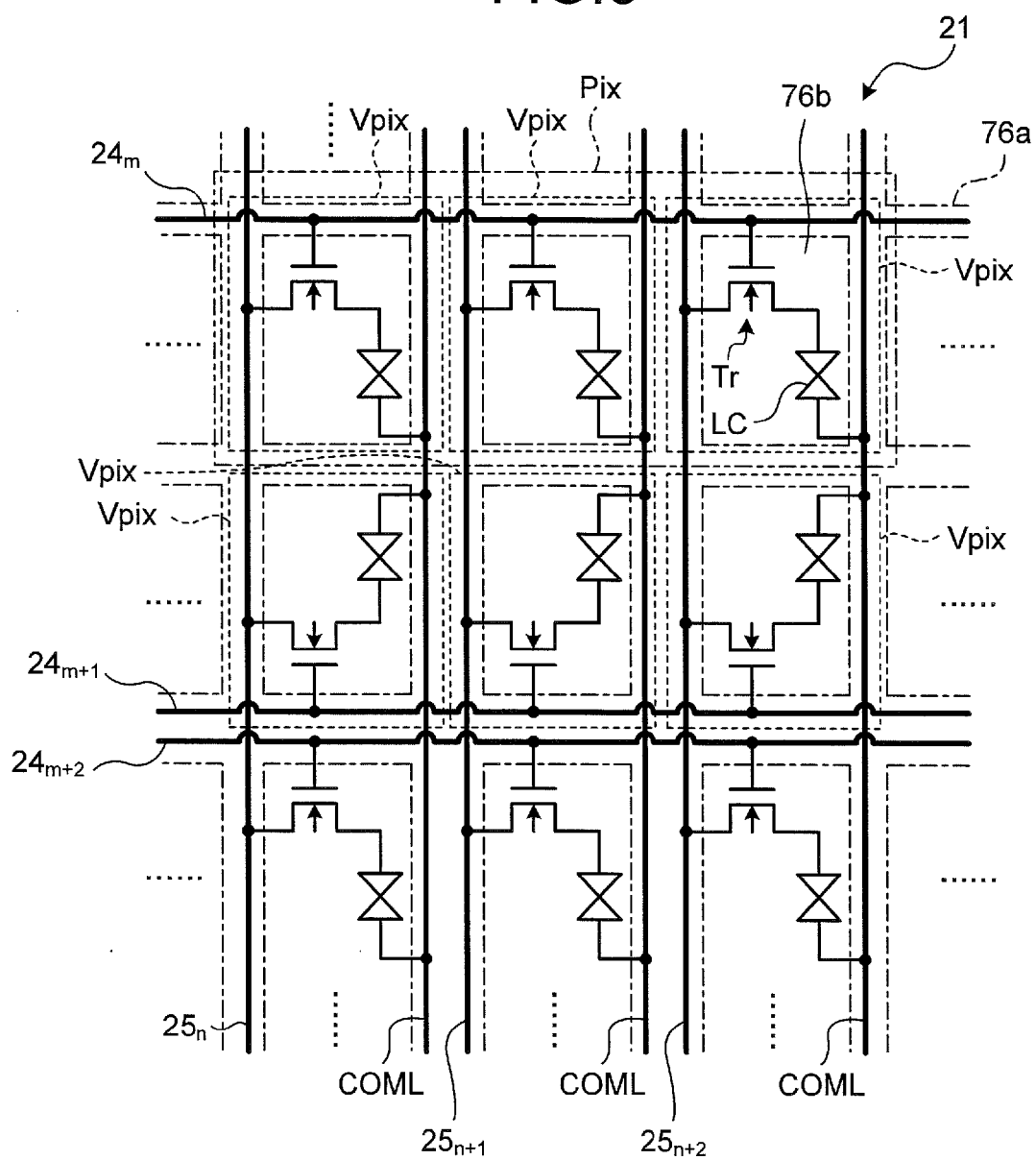
FIG. 5 is a circuit diagram of a drive circuit that drives pixels of a display device according to a first embodiment.

FIG. 5 is a circuit diagram of a drive circuit that drives pixels of a display device according to a first embodiment. In the drive circuit according to the first embodiment, as illustrated in FIG. 5, the pixels Vpix in a second row in the display area 21 are vertically inverted in the vertical scanning direction (vertical direction in the figure). Along with that, the scan line $24_{m+1}$ is provided between the pixels Vpix in the second row and the scan line $24_{m+2}$ in a third row. In other words, the scan line $24_{m+1}$ and the scan line $24_{m+2}$ are adjacent to each other.

Figure 6:
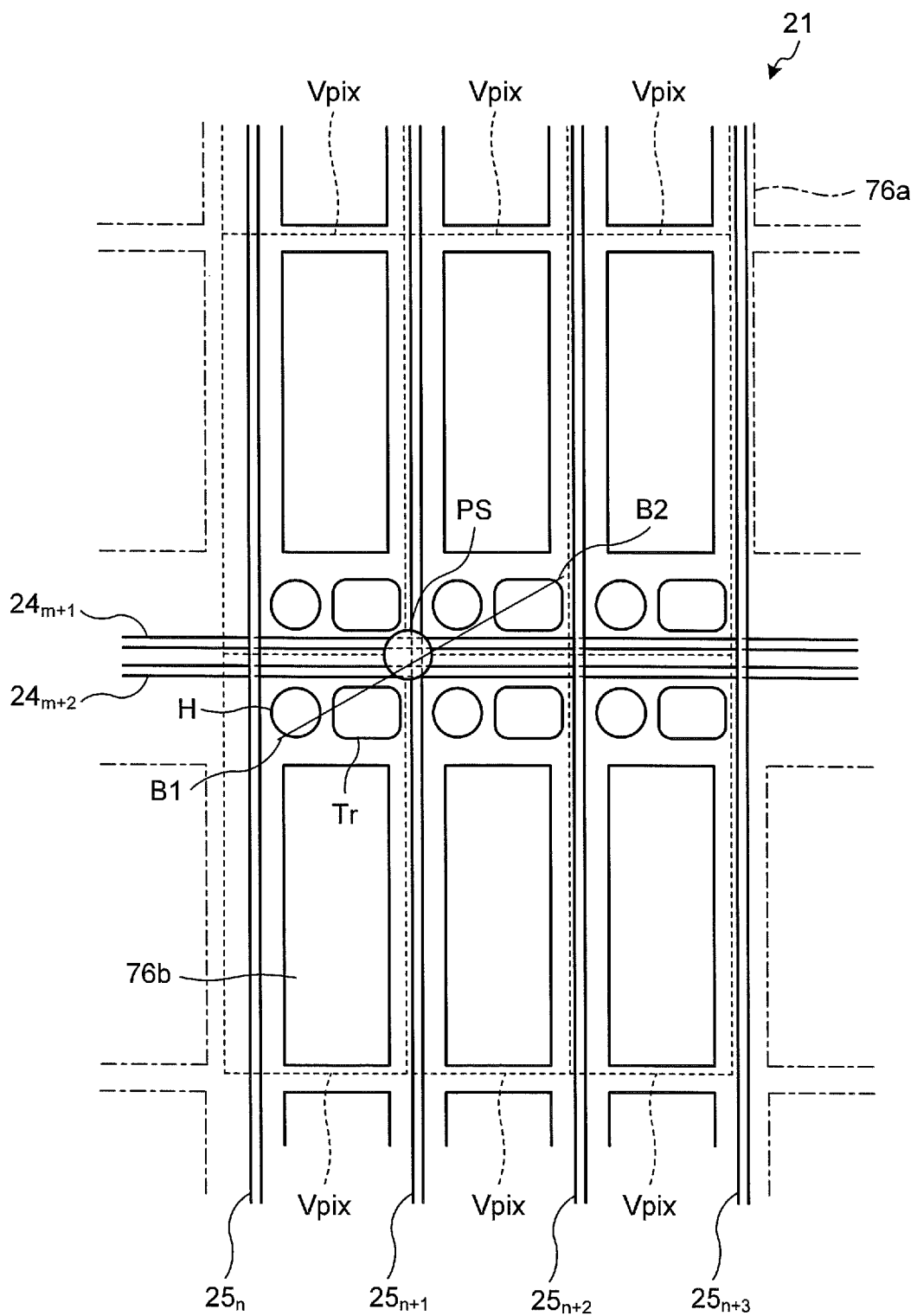
FIG. 6 is a layout diagram of the drive circuit that drives the pixels of the display device according to the first embodiment.

FIG. 6 is a layout diagram of the drive circuit that drives pixels of the display device according to the first embodiment. Each of the pixels Vpix in a first row of FIG. 6 has the opening 76b formed in an upper part thereof in the vertical scanning direction (upper side in the figure), has the TFT element Tr arranged in the right of a lower side thereof in the vertical scanning direction (lower side in the figure), and has the contact hall H, through which the pixel electrode is coupled to the drain of the TFT element Tr, formed in the left of a lower side thereof in the vertical scanning direction (lower side in the figure). Each of the pixels Vpix in the second row of FIG. 6 has the opening 76b formed in a lower part thereof in the vertical scanning direction (lower side in the figure), has the TFT element Tr arranged in the right of an upper side thereof in the vertical scanning direction (upper side in the figure), and has the contact hall H, through which the pixel electrode is coupled to the drain of the TFT element Tr, formed in the left of an upper side thereof in the vertical scanning direction (upper side in the figure). The scan line $24_{m+1}$ and the scan line $24_{m+2}$ are adjacently arranged between the pixels Vpix in the first row and the pixels Vpix in the second row in FIG. 6. In addition, the photo spacer PS for maintaining the gap between the first substrate and the second substrate to a predetermined gap is disposed above the scan line $24_{m+1}$ and the scan line $24_{m+2}$ (the near side in the direction perpendicular to the front).

Figure 7:
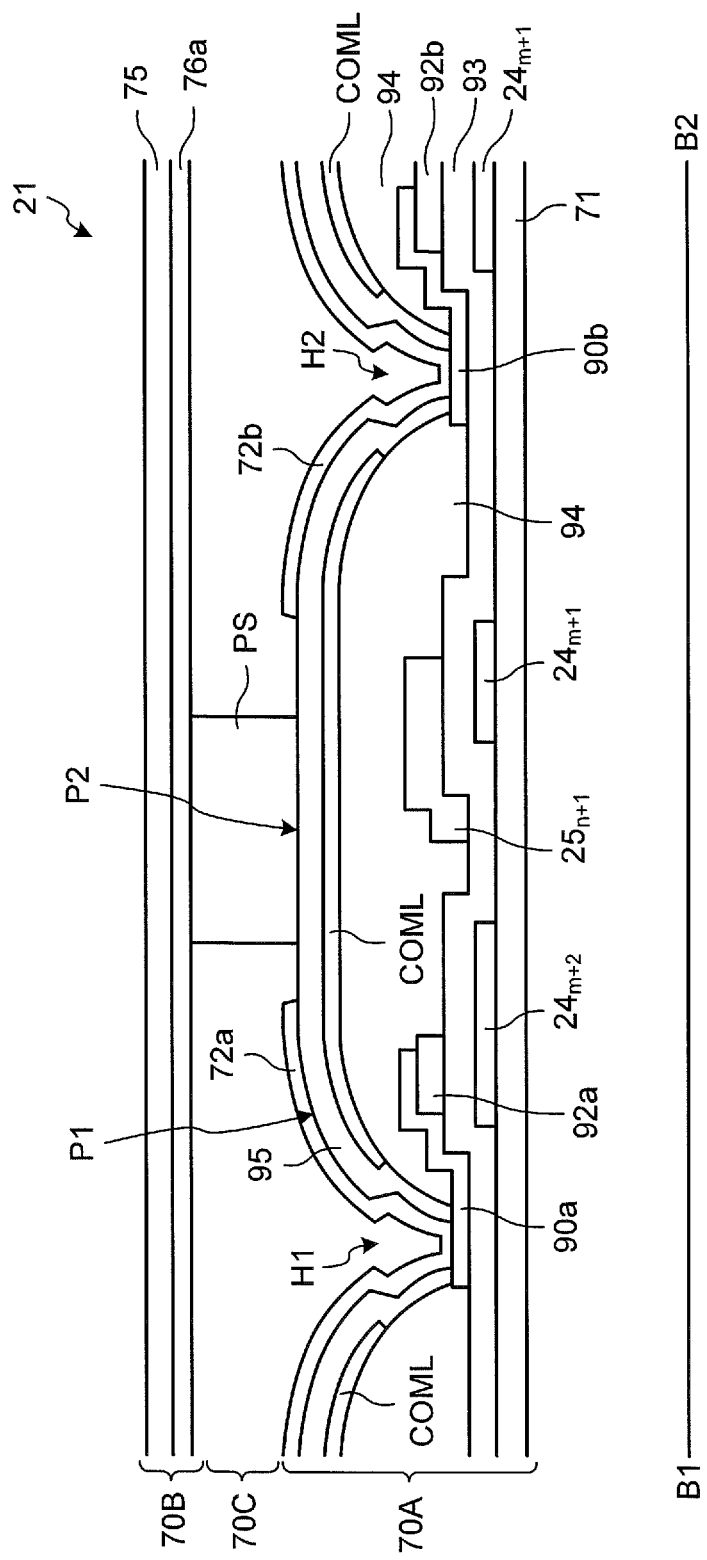
FIG. 7 is a cross-sectional view along line B1-B2 in FIG. 6.

FIG. 7 is a cross-sectional view along line B1-B2 in FIG. 6. The display area 21 includes, as illustrated in FIG. 7, the pixel substrate (first substrate) 70A, the counter substrate (second substrate) 70B arranged to face the pixel substrate 70A in the vertical direction with respect to the surface of the pixel substrate 70A, and the liquid crystal layer 70C interposed between the pixel substrate 70A and the counter substrate 70B. The backlight (not illustrated) is arranged on a face of the pixel substrate 70A on the opposite side to the liquid crystal layer 70C.

The liquid crystal layer 70C is used to modulate light passing therethrough according to the state of the electric field, and a liquid crystal in the horizontal electric field mode such as FFS mode and IPS mode can be used. The present disclosure can also use a liquid crystal in various modes such as TN mode, VA mode, and ECB mode. Alignment films may be provided between the liquid crystal layer 70C and the pixel substrate 70A and between the liquid crystal layer 70C and the counter substrate 70B illustrated in FIG. 7, respectively.

The counter substrate 70B includes the glass substrate 75 and the black matrix 76a formed on a face of the glass substrate 75. The black matrix 76a faces the liquid crystal layer 70C in the vertical direction with respect to the pixel substrate 70A.

The pixel substrate 70A includes the TFT substrate 71 as a circuit board. The scan line $24_{m+1}$ and the scan line $24_{m+2}$ are formed on the TFT substrate 71. The gate insulating film 93 is formed over the scan line $24_{m+1}$ and the scan line $24_{m+2}$. An amorphous silicon (a-Si) semiconductor layer 92a constituting a TFT element Tr is formed over the gate insulating film 93 above the scan line $24_{m+2}$. The data line $25_{n+1}$ is formed on the gate insulating film 93 above the scan line $24_{m+1}$. A drain electrode 90a constituting the TFT element Tr is formed on the left side of the semiconductor layer 92a in the figure and over the gate insulating film 93. The drain electrode 90a is electrically coupled to part of the semiconductor layer 92a. A drain electrode 90b is formed over the gate insulating film 93 on the right side of the data line $25_{n+1}$ in the figure.

Formed over the TFT element Tr is the organic insulating film 94 composed of organic components. The drive electrode COML is formed over the organic insulating film 94 and from above the drain electrode 90a to above the drain electrode 90b. The insulating film 95 is formed over the drive electrode COML and above the organic insulating film 94. The drive electrode COML is vertically enclosed by the organic insulating film 94 and the insulating film 95 to be insulated from the TFT element Tr.

A contact hall H1 and a contact hall H2 are formed on the drain electrode 90a and the drain electrode 90b through the organic insulating film 94 and the insulating film 95, respectively. A pixel electrode 72a is formed over the drain electrode 90a and the insulating film 95 above the semiconductor layer 92a. The pixel electrode 72a and the drain electrode 90a are coupled to each other at the bottom of the contact hall H1. A pixel electrode 72b is formed over the drain electrode 90b and the insulating film 95 above a semiconductor layer 92b. The pixel electrode 72b and the drain electrode 90b are coupled to each other at the bottom of the contact hall H2. The photo spacer PS for maintaining the gap between the pixel substrate 70A and the counter substrate 70B to a predetermined gap is formed on the insulating layer 95 and above the scan line $24_{m+1}$ and the scan line $24_{m+2}$.

In the first embodiment, the scan line $24_{m+1}$ and the scan line $24_{m+2}$ are adjacently arranged. Therefore, in the first embodiment, a distance between the contact hall H1 and the contact hall H2 is long so that a curvature of an upper surface (top surface) P2 of the insulating film 95 above the scan line $24_{m+1}$ and the scan line $24_{m+2}$ is significantly smaller than that of an upper surface (top surface) P1 of the insulating film 95 above the semiconductor layer 92a even if each wall of the contact hall H1 and the contact hall H2 becomes a smoothly curved surface. Furthermore, in the first embodiment, the photo spacer PS is formed on a portion where the curvature of the insulating film 95 is significantly small, i.e., above the scan line $24_{m+1}$ and the scan line $24_{m+2}$. Thereby, in the first embodiment, the photo spacer PS can be formed and disposed on the insulating layer 95 sufficiently stably. Therefore, according to the first embodiment, it is possible to reduce the necessity of concealing the alignment defect caused by scratches due to the photo spacers PS, which enables reduction in the necessity of enlarging the black matrix 76a. Thus, in the first embodiment, it is possible to prevent the opening 76b from becoming small and improve luminance and display quality. Moreover, in the first embodiment, the photo spacer PS can be formed on the insulating film 95 sufficiently stably, and therefore unevenness of the cell gap can be reduced, thus improving the image quality.

The first embodiment represents the example of forming the photo spacer PS above the scan line $24_{m+1}$ and the scan line $24_{m+2}$ as illustrated in FIG. 7. However, the photo spacer PS may be formed above the scan line $24_{m+1}$ or may be formed above the scan line $24_{m+2}$. In other words, at least part of the photo spacer PS may be formed above at least one of the scan line $24_{m+1}$ and the scan line $24_{m+2}$. In other words, at least part of the photo spacer PS may be formed within an area partitioned by the scan line $24_{m+1}$ and the scan line $24_{m+2}$.

The first embodiment also represents the example of vertically inverting the pixels Vpix in the second row of FIG. 5 in the vertical scanning direction (vertical direction in the figure), adjacently arranging the scan line $24_{m+1}$ and the scan line $24_{m+2}$, and forming the photo spacer PS above the scan line $24_{m+1}$ and the scan line $24_{m+2}$. However, as explained in another embodiment explained later, it may be configured to invert pixels Vpix in certain columns along the direction (horizontal direction in the figure) perpendicular to the vertical scanning direction (vertical direction in the figure) within the same plane, adjacently arrange two data lines 25, and form the photo spacer PS above the data lines 25.

In the present embodiment, the amorphous silicon (a-Si) is used as the semiconductor layer 92 constituting the TFT element Tr; however, the embodiment is not limited thereto. Polycrystalline silicon (poly-Si) may be used as the semiconductor layer 92. Instead of silicon, other semiconductor materials (e.g., germanium (Ge)) may be used, or a material (e.g., silicon germanium (SiGe)) obtained by adding any other material to silicon may also be used. An oxide semiconductor material may be used as the semiconductor layer 92. As the oxide semiconductor material, for example, an oxide semiconductor material containing indium (In) may be used.

In the present embodiment, the TFT element Tr is a bottom gate type TFT in which the gate is formed below the semiconductor layer; however, if possible, a top gate type TFT in which the gate is formed above the semiconductor layer may be used.

1-4. Second Embodiment

Figure 8:
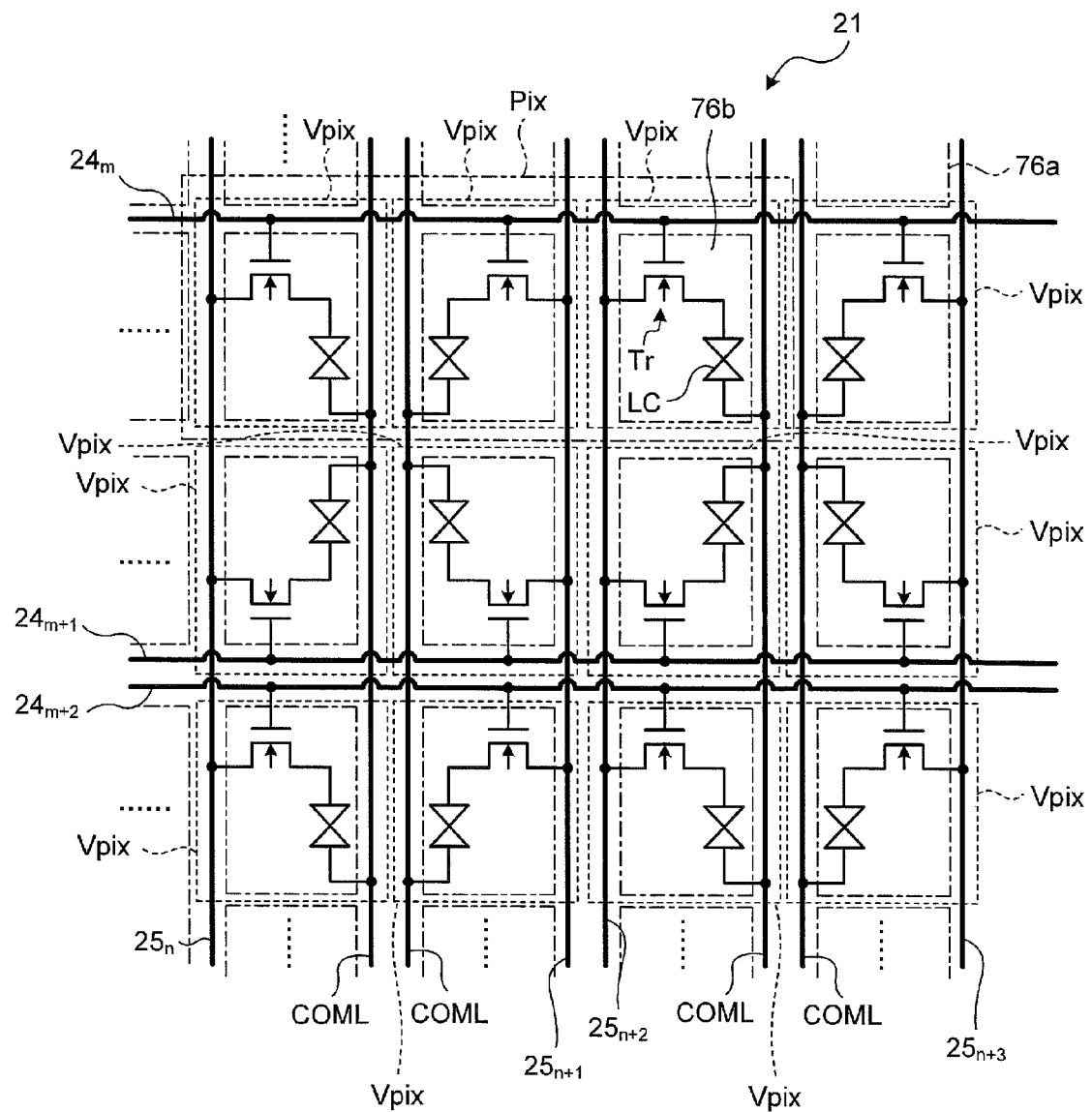
FIG. 8 is a circuit diagram of a drive circuit that drives pixels of a display device according to a second embodiment.

FIG. 8 is a circuit diagram of a drive circuit that drives pixels of a display device according to a second embodiment.

In the drive circuit according to the second embodiment, as illustrated in FIG. 8, the pixels Vpix in the second row of FIG. 8 in the display area 21 are vertically inverted in the vertical scanning direction (vertical direction in the figure). Along with that, the scan line $24_{m+1}$ is provided between the pixels Vpix in the second row and the scan line $24_{m+2}$ in the third row. In other words, the scan line $24_{m+1}$ and the scan line $24_{m+2}$ are adjacent to each other. Moreover, in the drive circuit according to the second embodiment, as illustrated in FIG. 8, the pixels Vpix in a second column and a fourth column in the display area 21 are inverted along a direction perpendicular to the vertical scanning direction (horizontal direction in the figure). Along with that, the data line $25_{n+1}$ is provided between the pixels Vpix in the second column and the data line $25_{n+2}$ in the third column. In other words, the data line $25_{n+1}$ and the data line $25_{n+2}$ are adjacent to each other.

Figure 9:
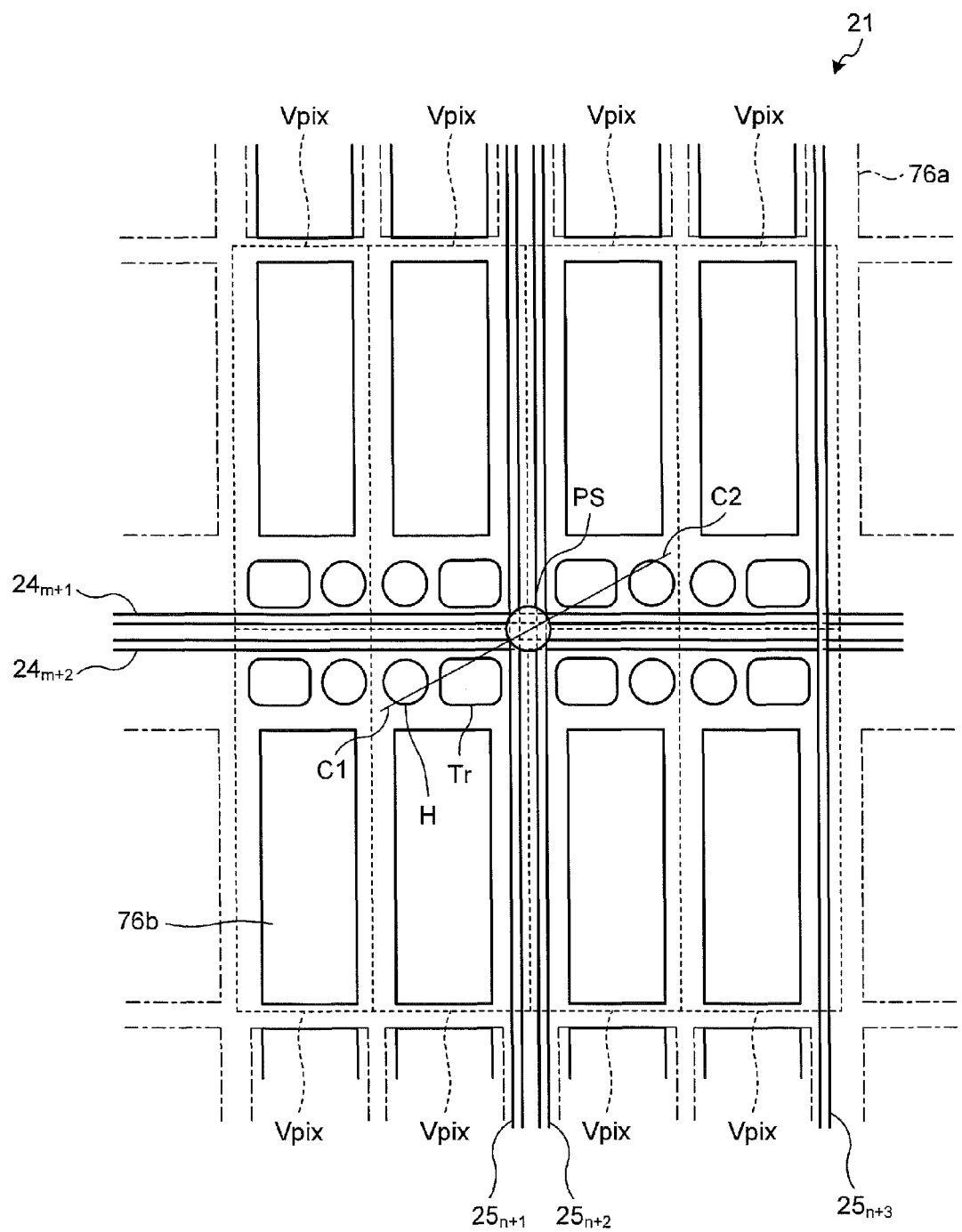
FIG. 9 is a layout diagram of the drive circuit that drives the pixels of the display device according to the second embodiment.

FIG. 9 is a layout diagram of the drive circuit that drives pixels of the display device according to the second embodiment. The pixel Vpix in the first row and in a first column of FIG. 9 has the opening 76b formed in an upper part thereof in the vertical scanning direction (upper side in the figure), has the TFT element Tr arranged in the left of a lower side thereof in the vertical scanning direction (lower side in the figure), and has the contact hall H, through which the pixel electrode is coupled to the drain of the TFT element Tr, formed in the right of a lower side thereof in the vertical scanning direction (lower side in the figure). The pixel Vpix in the second row and in the first column of FIG. 9 has the opening 76b formed in a lower part thereof in the vertical scanning direction (lower side in the figure), has the TFT element Tr arranged in the left of an upper side thereof in the vertical scanning direction (upper side in the figure), and has the contact hall H, through which the pixel electrode is coupled to the drain of the TFT element Tr, formed in the right of an upper side thereof in the vertical scanning direction (upper side in the figure).

The pixel Vpix in the first row and in the second column of FIG. 9 has the opening 76b formed in an upper part thereof in the vertical scanning direction (upper side in the figure), has the TFT element Tr arranged in the right of a lower side thereof in the vertical scanning direction (lower side in the figure), and has the contact hall H, through which the pixel electrode is coupled to the drain of the TFT element Tr, formed in the left of a lower side thereof in the vertical scanning direction (lower side in the figure). The pixel Vpix in the second row and in the second column of FIG. 9 has the opening 76b formed in a lower part thereof in the vertical scanning direction (lower side in the figure), has the TFT element Tr arranged in the right of an upper side thereof in the vertical scanning direction (upper side in the figure), and has the contact hall H, through which the pixel electrode is coupled to the drain of the TFT element Tr, formed in the left of an upper side thereof in the vertical scanning direction (upper side in the figure).

The pixel Vpix in the first row and in the third column of FIG. 9 has the opening 76b formed in an upper part thereof in the vertical scanning direction (upper side in the figure), has the TFT element Tr arranged in the left of a lower side thereof in the vertical scanning direction (lower side in the figure), and has the contact hall H, through which the pixel electrode is coupled to the drain of the TFT element Tr, formed in the right of a lower side thereof in the vertical scanning direction (lower side in the figure). The pixel Vpix in the second row and in the third column of FIG. 9 has the opening 76b formed in a lower part in the vertical scanning direction (lower side in the figure), has the TFT element Tr arranged in the left of an upper side thereof in the vertical scanning direction (upper side in the figure), and has the contact hall H, through which the pixel electrode is coupled to the drain of the TFT element Tr, formed in the right of an upper side thereof in the vertical scanning direction (upper side in the figure).

The pixel Vpix in the first row and in the fourth column of FIG. 9 has the opening 76b formed in an upper part thereof in the vertical scanning direction (upper side in the figure), has the TFT element Tr arranged in the right of a lower side thereof in the vertical scanning direction (lower side in the figure), and has the contact hall H, through which the pixel electrode is coupled to the drain of the TFT element Tr, formed in the left of a lower side thereof in the vertical scanning direction (lower side in the figure). The pixel Vpix in the second row and in the fourth column of FIG. 9 has the opening 76b formed in a lower part thereof in the vertical scanning direction (lower side in the figure), has the TFT element Tr arranged in the right of an upper side thereof in the vertical scanning direction (upper side in the figure), and has the contact hall H, through which the pixel electrode is coupled to the drain of the TFT element Tr, formed in the left of an upper side thereof in the vertical scanning direction (upper side in the figure).

The scan line $24_{m+1}$ and the scan line $24_{m+2}$ are adjacently arranged between the pixels Vpix in the first row and the pixels Vpix in the second row of FIG. 9. In addition, the data line $25_{n+1}$ and the data line $25_{n+2}$ are adjacently arranged between the pixels Vpix in the second column and the pixels Vpix in the third column of FIG. 9.

The photo spacer PS for maintaining the gap between the first substrate and the second substrate to a predetermined gap is disposed above an intersection portion between the scan lines $24_{m+1}$ and $24_{m+2}$ and the data lines $25_{n+1}$ and $25_{n+2}$ (the near side in the direction perpendicular to the front).

Figure 10:
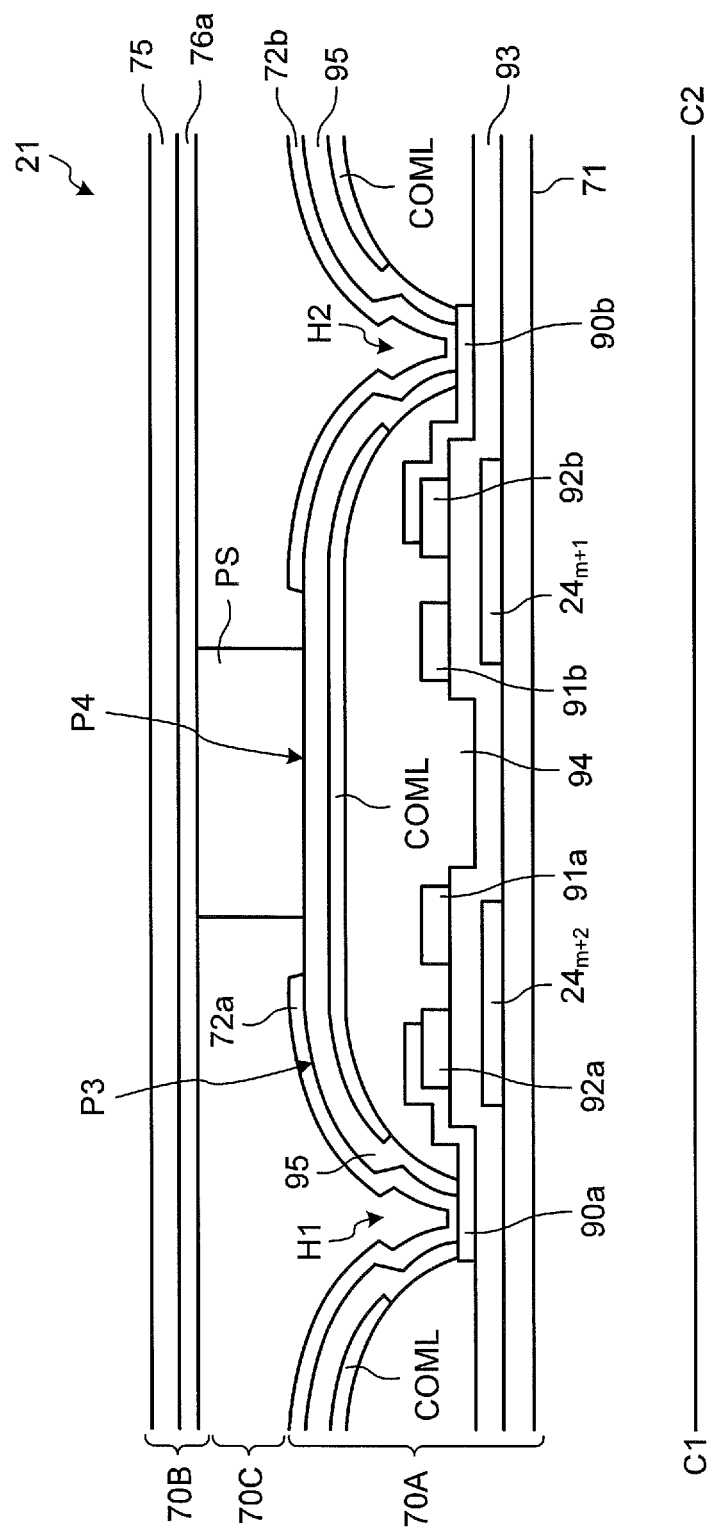
FIG. 10 is a cross-sectional view along line C1-C2 in FIG. 9.

FIG. 10 is a cross-sectional view along line C1-C2 in FIG. 9. The display area 21 includes, as illustrated in FIG. 10, the pixel substrate (first substrate) 70A, the counter substrate (second substrate) 70B arranged to face the pixel substrate 70A in the vertical direction with respect to the surface of the pixel substrate 70A, and the liquid crystal layer 70C interposed between the pixel substrate 70A and the counter substrate 70B. The backlight (not illustrated) is arranged on a face of the pixel substrate 70A on the opposite side to the liquid crystal layer 70C.

The liquid crystal layer 70C is used to modulate light passing therethrough according to the state of the electric field, and a liquid crystal in the horizontal electric field mode such as FFS mode and IPS mode can be used. The present disclosure can also use a liquid crystal in various modes such as TN mode, VA node, and ECB mode. Alignment films may be provided between the liquid crystal layer 70C and the pixel substrate 70A and between the liquid crystal layer 70C and the counter substrate 70B illustrated in FIG. 10, respectively.

The counter substrate 70B includes the glass substrate 75 and the black matrix 76a formed on a face of the glass substrate 75. The black matrix 76a faces the liquid crystal layer 70C in the vertical direction with respect to the pixel substrate 70A.

The pixel substrate 70A includes the TFT substrate 71 as a circuit board. The scan line $24_{m+1}$ and the scan line $24_{m+2}$ are formed on the TFT substrate 71. The gate insulating film 93 is formed over the scan line $24_{m+1}$ and the scan line $24_{m+2}$. The amorphous silicon (a-Si) semiconductor layer 92a constituting the TFT element Tr is formed over the gate insulating film 93 above the scan line $24_{m+2}$. The drain electrode 90a constituting the TFT element Tr is formed on the left side of the semiconductor layer 92a in the figure and over the gate insulating film 93. A source electrode 91a constituting the TFT element Tr is formed over the gate insulating film 93 above the scan line $24_{m+2}$ and on the right side to the semiconductor layer 92a in the figure.

The semiconductor layer 92b constituting the TFT element Tr is formed over the gate insulating film 93 above the scan line $24_{m+1}$. The drain electrode 90b constituting the TFT element Tr is formed on the right side of the semiconductor layer 92b in the figure and over the gate insulating film 93. A source electrode 91b constituting the TFT element Tr is formed over the gate insulating film 93 above the scan line $24_{m+1}$ and on the left side to the semiconductor layer 92b in the figure.

Formed over the TFT element Tr is the organic insulating film 94 composed of organic components. The drive electrode COML is formed over the organic insulating film 94 and from above the drain electrode 90a to above the drain electrode 90b. The insulating film 95 is formed over the drive electrode COML and above the organic insulating film 94. The drive electrode COML is vertically enclosed by the organic insulating film 94 and the insulating film 95 to be insulated from the TFT element Tr.

The contact hall H1 and the contact hall H2 are formed over the drain electrode 90a and the drain electrode 90b through the organic insulating film 94 and the insulating film 95, respectively. The pixel electrode 72a is formed over the drain electrode 90a and over the insulating film 95 above the semiconductor layer 92a. The pixel electrode 72a and the drain electrode 90a are coupled to each other at the bottom of the contact hall H1. The pixel electrode 72b is formed on the drain electrode 90b and over the insulating film 95 above the semiconductor layer 92b. The pixel electrode 72b and the drain electrode 90b are coupled to each other at the bottom of the contact hall H2. The photo spacer PS for maintaining the gap between the pixel substrate 70A and the counter substrate 70B to a predetermined gap is formed on the insulating layer 95 above the scan line $24_{m+1}$ and the scan line $24_{m+2}$.

In the second embodiment, the scan line $24_{m+1}$ and the scan line $24_{m+2}$ are adjacently arranged. In addition, in the second embodiment, the data line $25_{n+1}$ and the data line $25_{n+2}$ are adjacently arranged (see FIG. 9). Therefore, in the second embodiment, a distance between the contact hall H1 and the contact hall H2 is longer than that in the first embodiment so that a curvature of an upper surface (top surface) P4 of the insulating film 95 above the scan line $24_{m+1}$ and the scan line $24_{m+2}$ and above the data line $25_{n+1}$ and the data line $25_{n+2}$ is significantly smaller than that of an upper surface (top surface) P3 of the insulating film 95 above the semiconductor layer 92a even if each wall of the contact hall H1 and the contact hall H2 becomes a smoothly curved surface. Furthermore, in the second embodiment, the photo spacer PS is formed on a portion where the curvature of the insulating film 95 is significantly small, i.e., above the scan line $24_{m+1}$, the scan line $24_{m+2}$, the data line $25_{n+1}$, and the data line $25_{n+2}$. Thereby, in the second embodiment, the photo spacer PS can be formed and disposed on the insulating layer 95 in the sufficiently stable manner. Therefore, according to the second embodiment, it is possible to reduce the necessity of concealing the alignment defect caused by scratches due to the photo spacers PS, which enables reduction in the necessity of enlarging the black matrix 76a. Thus, in the second embodiment, it is possible to prevent the opening 76b from becoming small and improve luminance and display quality. Moreover, in the second embodiment, the photo spacer PS can be formed on the insulating film 95 sufficiently stably, and therefore unevenness of the cell gap can be reduced, thus improving the image quality.

The second embodiment represents the example of forming the photo spacer PS above the scan line $24_{m+1}$ and the scan line $24_{m+2}$ as illustrated in FIG. 10. However, the photo spacer PS may be formed above the scan line $24_{m+1}$ or may be formed above the scan line $24_{m+2}$. The photo spacer PS may be formed above the data line $25_{n+1}$ and the data line $25_{n+2}$, or may be formed above the data line $25_{n+1}$, or may be formed above the data line $25_{n+2}$. In other words, at least part of the photo spacer PS may be formed above at least one of the scan line $24_{m+1}$, the scan line $24_{m+2}$, the data line $25_{n+1}$, and the data line $25_{n+2}$. In other words, at least part of the photo spacer PS may be formed within an area partitioned by the scan line $24_{m+1}$, the scan line $24_{m+2}$, the data line $25_{n+1}$, and the data line $25_{n+2}$.

The second embodiment represents the example of vertically inverting the pixels Vpix in the second row of FIG. 8 in the display area 21 in the vertical scanning direction (vertical direction in the figure), adjacently arranging the scan line $24_{m+1}$ and the scan line $24_{m+2}$, inverting the pixels Vpix in the second column and the fourth column along the direction perpendicular to the vertical scanning direction (horizontal direction in the figure), adjacently arranging the data line $25_{n+1}$ and the data line $25_{n+2}$, and forming the photo spacer PS above the scan line $24_{m+1}$, the scan line $24_{m+2}$, the data line $25_{n+1}$, and the data line $25_{n+2}$. However, it may be configured to invert the pixels Vpix in the second column and the fourth column along the direction perpendicular to the vertical scanning direction, adjacently arrange the two data line $25_{n+1}$ and data line $25_{n+2}$, and form the photo spacer PS above the data line $25_{n+1}$ and the data line $25_{n+2}$.

In the present embodiment, also, the amorphous silicon (a-Si) is used as the semiconductor layer 92 constituting the TFT element Tr; however, the embodiment is not limited thereto. Polycrystalline silicon (poly-Si) may be used as the semiconductor layer 92. Instead of silicon, other semiconductor materials (e.g., germanium (Ge)) may be used, or a material (e.g., silicon germanium (SiGe)) obtained by adding any other material to silicon may also be used. Moreover, an oxide semiconductor material may be used as the semiconductor layer 92. As the oxide semiconductor material, for example, an oxide semiconductor material containing indium (In) may be used.

In the present embodiment, the TFT element Tr is the bottom gate type TFT in which the gate is formed below the semiconductor layer; however, if possible, the top gate type TFT in which the gate is formed above the semiconductor layer may be used.

2. Application Examples

Application examples of the display device 1 as explained in the embodiments will be explained below with reference to FIG. 11 to FIG. 23. FIG. 11 to FIG. 23 are diagrams of examples of an electronic apparatus with the display device 1 according to the present embodiment. The display device 1 according to the present embodiment can be applied to electronic apparatuses in all areas such as portable electronic apparatuses such as a mobile telephone and a smartphone, television devices, digital cameras, notebook personal computers, video cameras, or indicators mounted on vehicles. In other words, the display device 1 according to the present embodiment can be applied to electronic apparatuses in all areas that display an externally input video signal or an internally generated video signal as an image or a video. The electronic apparatuses include a control device that supplies a video signal to the display device to control operations of the display device.

2-1. Application Example 1

Figure 11:
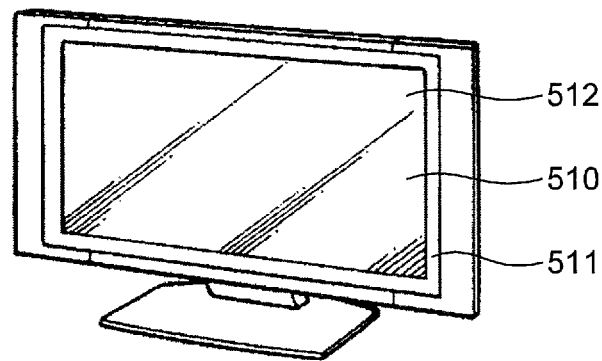
FIG. 11 is a diagram of an example of an electronic apparatus to which the display device according to the embodiment is applied.

The electronic apparatus illustrated in FIG. 11 is a television device to which the display device 1 according to the present embodiment is applied. Examples of the television device include, but are not limited to, a video display screen unit 510 including a front panel 511 and a filter glass 512, and the video display screen unit 510 is the display device 1 according to the present embodiment.

2-2. Application Example 2

Figure 12:
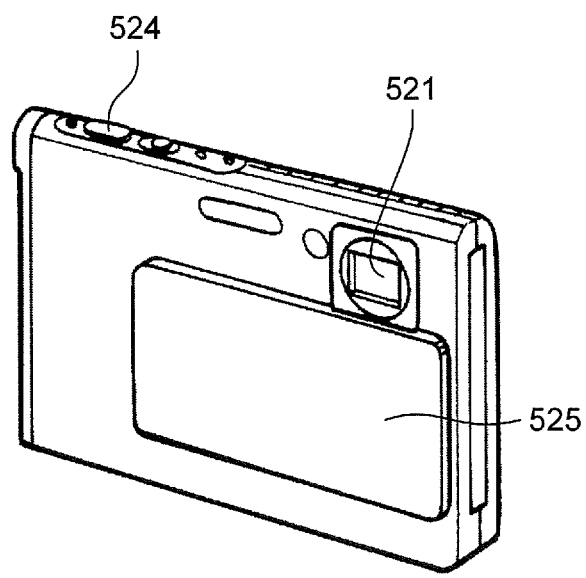
FIG. 12 is a diagram of an example of an electronic apparatus to which the display device according to the embodiment is applied.
Figure 13:
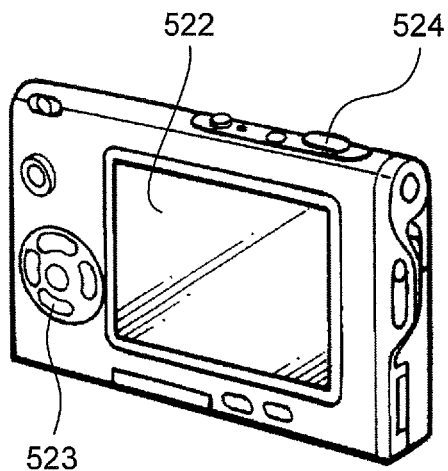
FIG. 13 is a diagram of an example of the electronic apparatus to which the display device according to the embodiment is applied.

The electronic apparatus illustrated in FIG. 12 and FIG. 13 is a digital camera to which the display device 1 according to the present embodiment is applied. Examples of the digital camera include, but are not limited to, a light emitting unit 521 for a flash, a display unit 522, a menu switch 523, and a shutter button 524, and the display unit 522 is the display device 1 according to the present embodiment. As illustrated in FIG. 12, the digital camera has a lens cover 525, and by sliding the lens cover 525, an imaging lens comes out. By photographing light incident through the imaging lens, a digital photo can be taken.

2-3. Application Example 3

Figure 14:
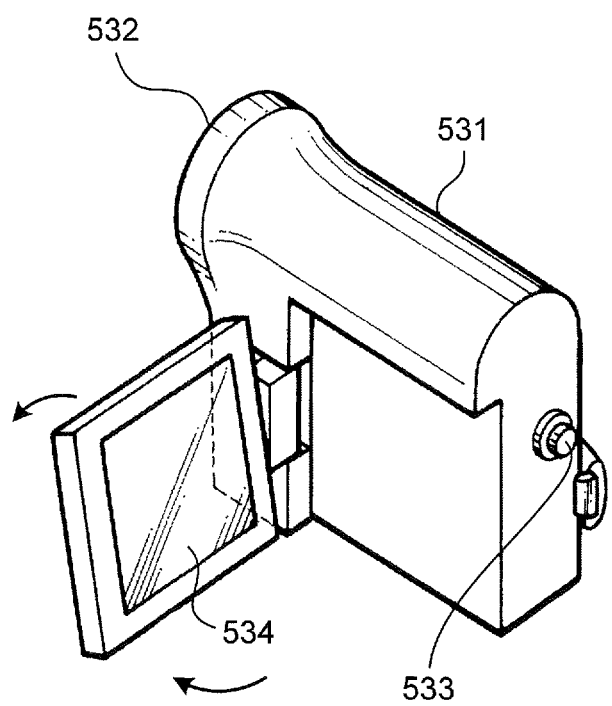
FIG. 14 is a diagram of an example of an electronic apparatus to which the display device according to the embodiment is applied.

The electronic apparatus illustrated in FIG. 14 represents an appearance of a video camera to which the display device 1 according to the present embodiment is applied. Examples of the video camera include, but are not limited to, a main body 531, a lens 532 for photographing a subject provided on the front side face of the main body 531, a start/stop switch 533 in photographing, and a display unit 534. The display unit 534 is the display device according to the present embodiment.

2-4. Application Example 4

Figure 15:
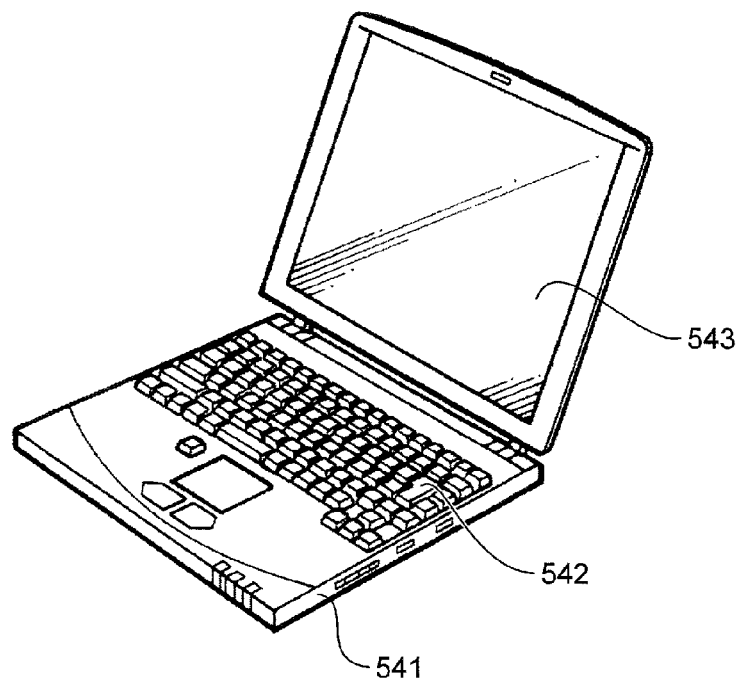
FIG. 15 is a diagram of an example of an electronic apparatus to which the display device according to the embodiment is applied.
Figure 16:
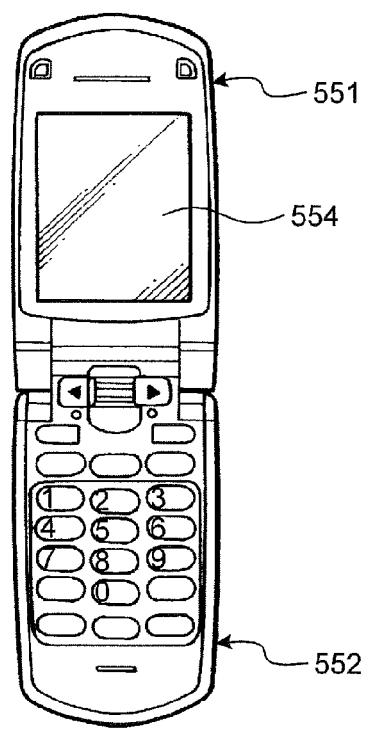
FIG. 16 is a diagram of an example of an electronic apparatus to which the display device according to the embodiment is applied.
Figure 17:
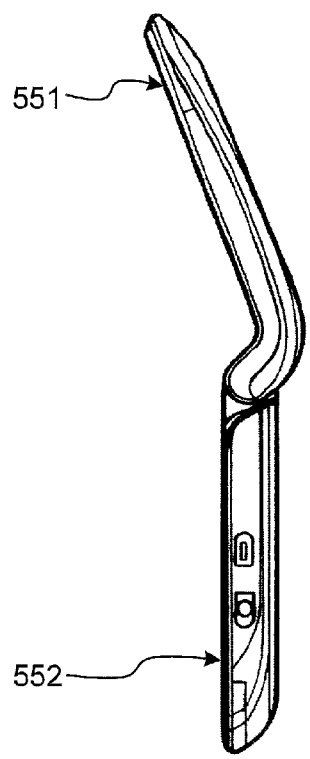
FIG. 17 is a diagram of an example of the electronic apparatus to which the display device according to the embodiment is applied.
Figure 18:
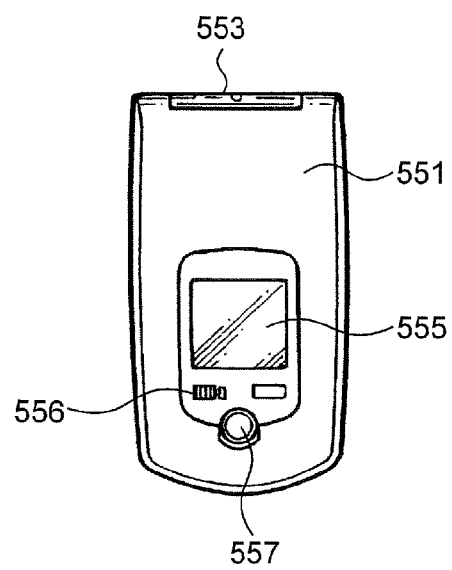
FIG. 18 is a diagram of an example of the electronic apparatus to which the display device according to the embodiment is applied.
Figure 19:
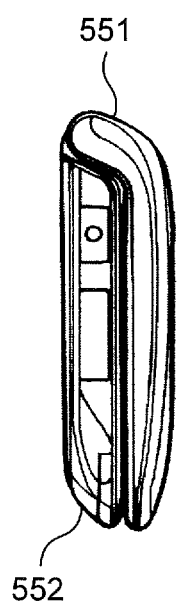
FIG. 19 is a diagram of an example of the electronic apparatus to which the display device according to the embodiment is applied.
Figure 20:
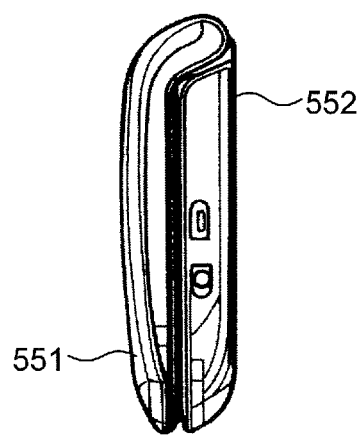
FIG. 20 is a diagram of an example of the electronic apparatus to which the display device according to the embodiment is applied.
Figure 21:
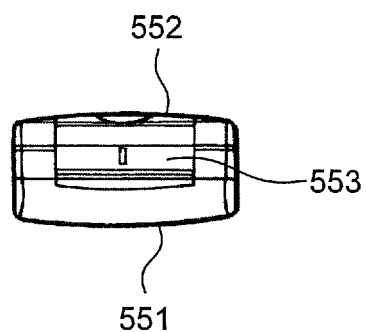
FIG. 21 is a diagram of an example of the electronic apparatus to which the display device according to the embodiment is applied.
Figure 22:
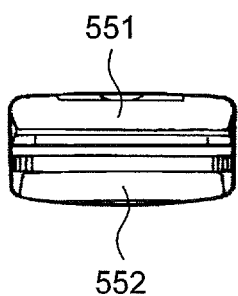
FIG. 22 is a diagram of an example of the electronic apparatus to which the display device according to the embodiment is applied.

The electronic apparatus illustrated in FIG. 15 is a notebook personal computer to which the display device 1 according to the present embodiment is applied. Examples of the notebook personal computer include, but are not limited to, a main body 541, a keyboard 542 for performing an input operation of text and the like, and a display unit 543 for displaying an image. The display unit 543 is composed of the display device according to the present embodiment.

2-5. Application Example 5

The electronic apparatus illustrated in FIG. 16 to FIG. 22 is a mobile phone to which the display device 1 according to the present embodiment is applied. The mobile phone is the one that has, for example, an upper housing 551 and a lower housing 552 coupled to each other with a connection (hinge portion) 553, and that includes a display 554, a sub-display 555, a picture light 556, and a camera 557. The display 554 or the sub-display 555 is composed of the display device according to the present embodiment.

2-6. Application Example 6

Figure 23:
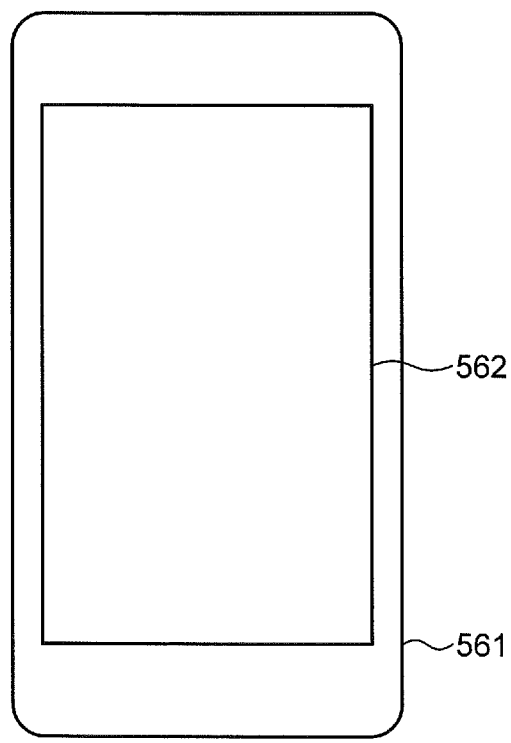
FIG. 23 is a diagram of an example of an electronic apparatus to which the display device according to the embodiment is applied.

The electronic apparatus illustrated in FIG. 23 is a portable information terminal that operates as a portable computer, a multifunctional mobile phone, a portable computer capable of performing voice communication, or as a portable computer capable of performing communication, and that is sometimes referred to as so-called a smartphone or a tablet terminal. The portable information terminal has a display unit 562 on the surface of, for example, a housing 561. The display unit 562 is the display device according to the present embodiment.

The display device and the electronic apparatus according to the present disclosure are capable of forming and disposing the spacers in the more stable manner.

According to one embodiment, a spacer is disposed on at least part of an area partitioned by two wirings, and the spacer is thereby formed and disposed in the more stable manner, thus improving the quality of images.

What is claimed is:

1. A display device comprising:
a first substrate;
a second substrate arranged opposite to the first substrate;
a liquid crystal layer interposed between the first substrate and the second substrate;
a plurality of pixels arranged in a matrix on the first substrate;
a first scan line arranged between a first row of the pixels and a second row of the pixels adjacent to the first row;
a second scan line arranged between the second row of the pixels and the first scan line;
an insulating film provided over the first scan line and the second scan line; and
a spacer for maintaining a gap between the first substrate and the second substrate, wherein
a first area on which the spacer is disposed overlaps at least part of a second area partitioned by the first scan line and the second scan line,
the spacer is disposed on the insulating film, and
a curvature of the surface of the insulating film in the first area is smaller than that of the surface of the insulating film outside the first area.

2. The display device according to claim 1, further comprising an element for each pixel scanned by the first scan line, wherein
the insulating film covers the element, and
a curvature of the surface of the insulating film in the first area is smaller than that of the surface of the insulating film above the element in the vertical direction with respect to the first substrate.

3. A display device comprising:
a first substrate;
a second substrate arranged opposite to the first substrate;
a liquid crystal layer interposed between the first substrate and the second substrate;
a plurality of pixels arranged in a matrix on the first substrate;
a first data line arranged between a first column of the pixels and a second column of the pixels adjacent to the first column;
a second data line arranged between the second column of the pixels and the first data line;
an insulating film provided over the first data line and the second data line; and
a spacer for maintaining a gap between the first substrate and the second substrate, wherein a first area on which the spacer is disposed overlaps at least part of a second area partitioned by the first data line and the second data line, the spacer is disposed on the insulating film, and a curvature of the surface of the insulating film in the first area is smaller than that of the surface of the insulating film outside the first area.

4. The display device according to claim 3, further comprising an element for each pixel scanned by the first scan line, wherein the insulating film covers the element, and a curvature of the surface of the insulating film in the first area is smaller than that of the surface of the insulating film above the element in the vertical direction with respect to the first substrate.

5. A display device comprising:

a first substrate;

a second substrate arranged opposite to the first substrate;

a liquid crystal layer interposed between the first substrate and the second substrate;

a plurality of pixels arranged in a matrix on the first substrate;

a first scan line arranged between a first row of the pixels and a second row of the pixels adjacent to the first row;

a second scan line arranged between the second row of the pixels and the first scan line;

a first data line arranged between a first column of the pixels and a second column of the pixels adjacent to the first column;

a second data line arranged between the second column of the pixels and the first data line; and a spacer for maintaining a gap between the first substrate and the second substrate, wherein a first area on which the spacer is disposed overlaps at least part of a third area partitioned by the first scan line, the second scan line, the first data line, and the second data line.

6. The display device according to claim 5, further comprising an insulating film provided over the first scan line, the second scan line, the first data line, and the second data line, wherein the spacer is disposed on the insulating film, and a curvature of the surface of the insulating film in the first area is smaller than that of the surface of the insulating film outside the first area.

7. The display device according to claim 6, further comprising an element for each pixel scanned by the first scan line, wherein the insulating film covers the element, and a curvature of the surface of the insulating film in the first area is smaller than that of the surface of the insulating film above the element in the vertical direction with respect to the first substrate.

* * * * *